United States Patent
Xu et al.

(10) Patent No.: US 6,906,479 B2
(45) Date of Patent: Jun. 14, 2005

(54) GAS TURBINE ENGINE STARTER GENERATOR WITH MULTIPLE WINDINGS ON EACH EXCITER STATOR POLE

(75) Inventors: Mingzhou Xu, Tucson, AZ (US);
Wayne T. Pearson, Tucson, AZ (US);
Cristian E. Anghel, Mississauga (CA);
Nicolae Morcov, Mississauga (CA)

(73) Assignee: Honeywell International, Inc., Morristown, NJ (US)

( * ) Notice: Subject to any disclaimer, the term of this patent is extended or adjusted under 35 U.S.C. 154(b) by 138 days.

(21) Appl. No.: 10/317,931

(22) Filed: Dec. 12, 2002

(65) Prior Publication Data

US 2004/0027078 A1 Feb. 12, 2004

Related U.S. Application Data

(63) Continuation-in-part of application No. 10/213,649, filed on Aug. 6, 2002.

(51) Int. Cl.[7] .............................. H02P 5/20; H02P 7/32; H02P 9/10; H02K 7/20; H02K 17/00
(52) U.S. Cl. ............................. 318/140; 322/59; 290/8; 310/206; 310/207; 310/208
(58) Field of Search ................................ 322/59; 290/8; 310/198, 113, 206–208, 186, 195, 189, 200; 318/140, 141, 146, 147, 148, 151, 152, 157, 461

(56) References Cited

U.S. PATENT DOCUMENTS

| | | | |
|---|---|---|---|
| 599,932 A | 3/1898 | Frankenfield et al. | |
| 2,057,214 A | 10/1936 | Sleeter et al. | |
| 3,233,158 A | 2/1966 | Gilbert | |
| 3,263,144 A | 7/1966 | Neyhouse et al. | |
| 3,412,304 A | 11/1968 | Baum et al. | |
| 3,585,471 A | 6/1971 | Ecclesia | |
| 3,676,764 A | * 7/1972 | Syverson | 322/51 |
| 3,753,069 A | 8/1973 | Newton | |
| 3,761,753 A | 9/1973 | Fong et al. | |
| 3,842,327 A | 10/1974 | Wexler | |
| 3,908,161 A | * 9/1975 | Messenger | 322/29 |
| 3,946,259 A | * 3/1976 | McBride et al. | 310/49 R |
| 3,970,908 A | 7/1976 | Hansen et al. | |
| 4,072,880 A | 2/1978 | Oshima et al. | |
| 4,093,869 A | * 6/1978 | Hoffmann et al. | 290/31 |
| 4,107,583 A | 8/1978 | Houtman | |
| 4,138,629 A | * 2/1979 | Miller et al. | 318/140 |
| 4,246,531 A | * 1/1981 | Jordan | 322/28 |
| 4,352,051 A | 9/1982 | Johnson | |
| 4,371,906 A | 2/1983 | Alessio et al. | |
| 4,378,520 A | 3/1983 | Ford | |
| 4,408,152 A | * 10/1983 | Szipl et al. | 322/29 |
| 4,451,775 A | 5/1984 | Phillips et al. | |
| 4,459,532 A | 7/1984 | Schutten et al. | |
| 4,675,591 A | 6/1987 | Pleiss | |
| 4,743,777 A | * 5/1988 | Shilling et al. | 290/46 |
| 4,862,053 A | 8/1989 | Jordan et al. | |
| 4,868,406 A | * 9/1989 | Glennon et al. | 290/4 R |
| 4,887,020 A | * 12/1989 | Graham | 322/63 |
| 4,992,721 A | * 2/1991 | Latos | 322/10 |
| 5,103,153 A | 4/1992 | Droho | |
| 5,418,436 A | 5/1995 | Apuzzo | |
| 5,428,275 A | 6/1995 | Carr et al. | |

(Continued)

Primary Examiner—David Martin
Assistant Examiner—Patrick Miller
(74) Attorney, Agent, or Firm—Ingrassia Fisher & Lorenz

(57) ABSTRACT

A rotating electrical machine, such as an aircraft starter-generator, includes an exciter that has its stator windings divided into a number of sections. A plurality of switches are electrically coupled to the exciter stator winding sections and are configured and controlled so that the exciter stator winding sections may be selectively coupled in series or in parallel with one another, and selectively coupled to receive either DC or AC power.

22 Claims, 5 Drawing Sheets

U.S. PATENT DOCUMENTS

| | | |
|---|---|---|
| 5,430,362 A | 7/1995 | Carr et al. |
| 5,455,885 A | 10/1995 | Cameron |
| 5,537,020 A | 7/1996 | Couture et al. |
| 5,650,697 A | 7/1997 | Imagi et al. |
| 5,650,707 A | 7/1997 | Lipo et al. |
| 5,714,821 A * | 2/1998 | Dittman ............... 310/179 |
| 5,909,076 A * | 6/1999 | Smith .................. 310/177 |
| 6,025,693 A | 2/2000 | Smith |
| 6,040,679 A | 3/2000 | Monk et al. |
| 6,066,941 A | 5/2000 | French |
| 6,175,209 B1 * | 1/2001 | Fei ....................... 318/776 |
| 6,204,618 B1 | 3/2001 | Wang et al. |
| 6,320,348 B1 | 11/2001 | Kadah |
| 6,346,790 B1 | 2/2002 | Kemp et al. |
| 6,351,048 B1 * | 2/2002 | Schob et al. ............ 310/90.5 |
| 6,787,948 B2 * | 9/2004 | Peterson et al. ........ 310/58 |
| 2004/0108783 A1 * | 6/2004 | Kruse ................... 310/179 |

\* cited by examiner

GAS TURBINE ENGINE STARTER GENERATOR WITH MULTIPLE WINDINGS ON EACH EXCITER STATOR POLE

CROSS-REFERENCE TO RELATED APPLICATIONS

This application is a continuation-in-part (CIP) of pending U.S. application Ser. No. 10/213,649, filed on Aug. 6, 2002.

FIELD OF THE INVENTION

The present invention relates to rotating electrical machines such as high speed starter generators for gas turbine engines and, more particularly, to an exciter generator within a starter-generator having multiple stator windings on each stator pole that are selectively switchable between series and parallel configurations.

BACKGROUND OF THE INVENTION

An aircraft may include various types of rotating electrical machines such as, for example, generators, motors, and motor/generators. Motor/generators are used as starter-generators in some aircraft, since this type of rotating electrical machine may be operated as both a motor and a generator.

An aircraft starter-generator may include three separate brushless generators, namely, a permanent magnet generator (PMG), an exciter generator, and a main motor/generator. The PMG includes permanent magnets on its rotor. When the PMG rotor rotates, AC currents are induced in stator windings of the PMG. These AC currents are typically fed to a regulator or a control device, which in turn outputs a DC current if the starter-generator is operating as a generator. Conversely, if the starter-generator is operating as a motor, the control device supplies AC power.

If the starter-generator is operating as a generator, the DC current from the control device is supplied to stator windings of the exciter. As the exciter rotor rotates, three phases of AC current are typically induced in the exciter rotor windings. Rectifier circuits that rotate with the exciter rotor rectify this three-phase AC current, and the resulting DC currents are provided to the rotor windings of the main motor/generator. Finally, as the main motor/generator rotor rotates, three phases of AC current are typically induced in the main motor/generator stator, and this three-phase AC output can then be provided to a load.

If the starter-generator is operating as a motor, AC power from the control device is supplied to the exciter stator. This AC power induces, via a transformer effect, an electromagnetic field in the exciter armature, whether the exciter rotor is stationary or rotating. The AC currents produced by this induced field are rectified by the rectifier circuits and supplied to the main motor/generator rotor, which produces a DC field in the rotor. Variable frequency AC power is supplied from the control device to the main motor/generator stator. This AC power produces a rotating magnetic field in the main stator, which causes the main rotor to rotate and supply mechanical output power.

A starter-generator, such as the one described above, may be used to start the engines or auxiliary power unit (APU) of an aircraft when operating as a motor, and to supply electrical power to the aircraft power distribution system when operating as a generator. Thus, when operating as a motor, a starter-generator may be designed to supply mechanical output torque sufficient to start the engines. In addition, the starter-generator may be designed for optimal generator performance. For optimal generator performance, the exciter stator windings may be electrically connected in series with one another. However, with series coupled exciter stator windings, the exciter stator may need AC power with a relatively high voltage magnitude to generate sufficiently high rotational mechanical power when operating as a motor. This is because the exciter windings may exhibit a fairly low impedance to DC power, but a fairly high impedance to AC power. As a result, the AC power supply section of the starter-generator system may increase the size, weight, and cost of the overall starter-generator system.

Hence, there is a need for a starter-generator that, when operating as a motor, can generate torque that is sufficiently high to start an aircraft engine without adversely impacting the starter-generator's performance in the generating mode, and/or does not significantly impact the starter-generator size and/or weight and/or cost. The present invention addresses one or more of these needs.

SUMMARY OF THE INVENTION

The present invention relates to a gas turbine engine starter-generator that, when operating as a motor, can generate torque that is sufficiently high to start an aircraft engine and, when operating as a generator, can generate sufficient electrical power.

In one exemplary embodiment, and by way of example only, a gas turbine engine starter-generator includes a housing, a shaft, a main rotor, a main stator, an exciter rotor, an exciter stator, M number of separate exciter stator windings, and a control circuit. The shaft is rotationally mounted within the housing. The main rotor is mounted on the shaft. The main stator is mounted within the housing and is located at least partially around at least a portion of the main rotor. The exciter rotor is mounted on the shaft, and the exciter stator is mounted within the housing and is located at least partially around at least a portion of the exciter rotor. The exciter stator has N number of poles extending therefrom. The M number of separate exciter stator windings are each wound around each of the N number of poles. The control circuit is electrically coupled to at least a first predetermined number of the M number of separate exciter stator windings and is operable (i) to selectively supply AC and DC power thereto and (ii) to selectively couple at least a second predetermined number of the M number of separate exciter stator windings in one of series and parallel with one another.

In another exemplary embodiment, a motor/generator includes a rotationally mounted exciter, M number of separate exciter stator windings, and a control circuit. The exciter includes a rotor configured to rotate within the generator and a stator having N number of poles extending therefrom. The M number of separate exciter stator windings are each wound around each one of the N number of poles. The control circuit is electrically coupled to at least a first predetermined number of the M number of separate exciter stator windings and is operable (i) to selectively supply AC and DC power thereto and (ii) to selectively couple at least a second predetermined number of the M number of separate exciter stator windings in one of series and parallel with one another.

In still another exemplary embodiment, an exciter stator includes a main body, and M number of separate windings. The main body has N number of poles extending from a surface thereof. The M number of separate windings are each wound in series around each one of the N number of poles.

In yet another exemplary embodiment, a method of assembling an exciter stator includes supplying an exciter stator having N number of poles extending from a surface thereof. M number of separate conductors are wound, one each, around each of the N number of poles.

In yet still a further exemplary embodiment, in an aircraft starter-generator including at least an exciter assembly having a stator with N number of poles and M number of separate windings, each of which is wound on each of the N number of poles, a method of operating the starter-generator in a generator mode and a motor mode includes electrically coupling at least a first predetermined number of the M number of exciter stator windings in parallel with one another and supplying AC power to the parallel-coupled exciter stator windings, to thereby operate the starter-generator in the motor mode. At least a second predetermined number of the M number of exciter stator windings are electrically coupled in series with one another and DC power, rather than AC power, is supplied to the series-coupled exciter stator windings, to thereby operate the starter-generator in the generator mode.

Other independent features and advantages of the preferred starter generator will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the present invention is not limited to use in conjunction with a specific type of electrical machine. Thus, although the present invention is, for convenience of explanation, depicted and described as being implemented in a brushless AC (alternating current) motor/generator, it will be appreciated that it can be implemented in other AC motor/generator designs needed in specific applications.

Figure 1:
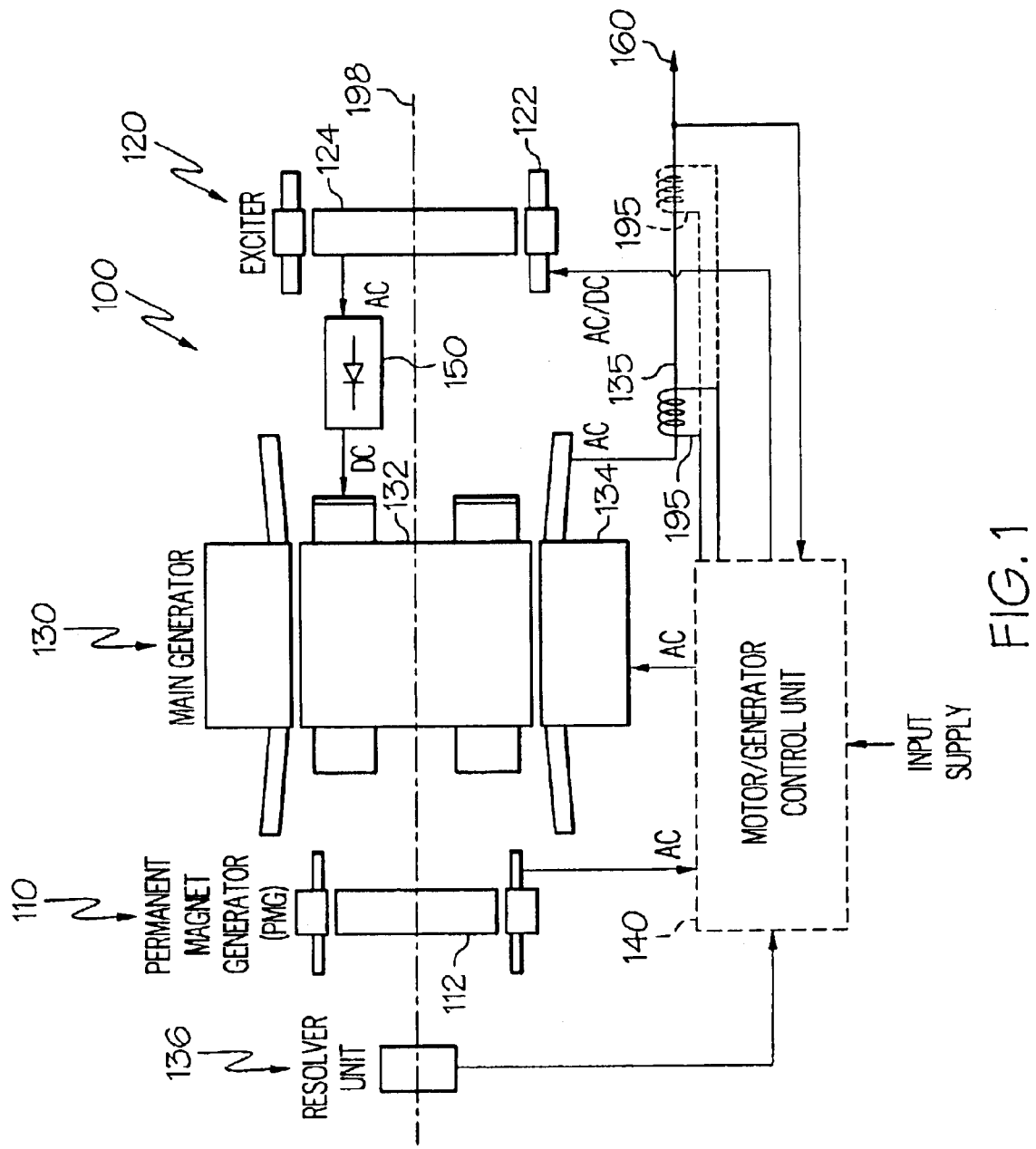
FIG. 1 is a functional schematic block diagram of an exemplary high speed starter-generator system according to an embodiment of the invention.

Turning now to the description, and with reference first to FIG. 1, a functional schematic block diagram of one embodiment of a high speed motor/generator system 100 is shown. This exemplary motor/generator system 100, which is commonly known as a brushless AC motor/generator, includes a permanent magnet generator (PMG) 110, an exciter 120, a main motor/generator 130, a motor/generator control unit 140, and one or more rectifier assemblies 150. It is noted that the motor/generator system 100 may be used as a starter-generator for a gas turbine engine in aircraft, space, marine, land, or other vehicle-related applications where gas turbine engines are used. For aircraft applications, gas turbine engines are used for propulsion (e.g., the aircraft's main engines) and/or for power (e.g., the auxiliary power unit (APU)).

When the motor/generator system 100 is operating as a generator, a rotor 112 of the PMG 110, a rotor 124 of the exciter 120, and a rotor 132 of the main motor/generator 130 all rotate. As the PMG rotor 112 rotates, the PMG 110 generates and supplies AC power to the motor/generator control unit 140, which in turn supplies controllable direct current (DC) power to a stator 122 of the exciter 120. The exciter rotor 124 in turn supplies AC power to the rectifier assemblies 150. The output from the rectifier assemblies 150 is DC power and is supplied to the main motor/generator rotor 132, which in turn outputs AC power from a main motor/generator stator 134.

During its operation as a generator, the motor/generator system 100 is capable of supplying output power at a variety of frequencies. Alternatively, a gearing system may be used to operate the motor/generator at a constant speed and, thus, supply a constant frequency. The output power from the main motor/generator stator 134 is typically three-phase AC power. One or more stator output leads 135 supplies the generated AC power to external systems and equipment via one or more terminal assemblies 160, which are discussed in more detail below. The motor/generator control unit 140 can regulate the power output based upon monitoring signals provided to it from monitoring devices 195. In the depicted embodiment, the PMG 110, the exciter 120, and the main motor/generator 130 all rotate along a single axis 198 at the same rotational speed. It will be appreciated, however, that in other embodiments the PMG 110 may rotate along a different axis. Moreover, the relative positioning of the PMG 110, the exciter 120, and the main motor/generator 130 can be modified in different embodiments such that the exciter 120 is physically between the PMG 110 and the main motor/generator 130.

Figure 2:
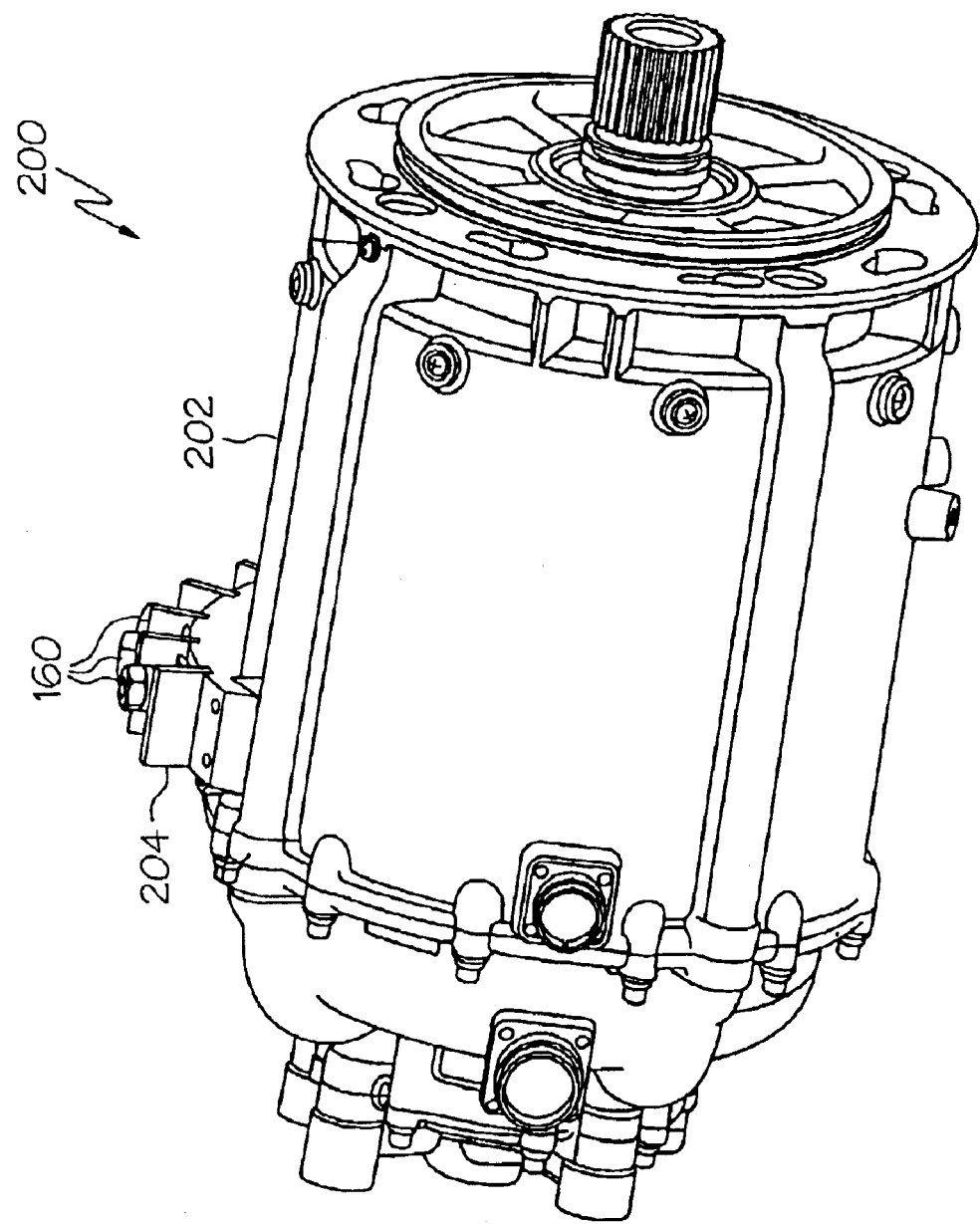
FIG. 2 is a perspective view of a physical embodiment of the starter-generator system depicted in FIG. 1.

When the motor/generator system 100 is operating as a motor, AC power is supplied to the exciter stator 122 and the main motor/generator stator 134 from, for example, an AC power supply section (discussed below) in the motor/generator control unit 140, causing the main motor/generator rotor 132 to rotate. As the main motor/generator rotor 132 rotates, the PMG 110 and exciter 120 also rotate. A position sensing device, such as a resolver unit 136, may also be included in the system 100 to supply a signal representative of the main motor/generator rotor 132 position to the motor/generator control unit 140. This position signal is used to control the AC power supplied to the main motor/generator stator 134 and to the exciter such that the maximum torque is generated. It will be appreciated, however, that the resolver unit 136 need not be included in the motor/generator system 100. Instead, the position signal may be produced using a sensorless method, in which the position is derived from various electrical signals in the motor/generator system 100. A perspective view of an exemplary physical embodiment of at least those portions of the motor/generator system 100 that are mounted within a housing 200 is illustrated in FIG. 2.

Figure 3:
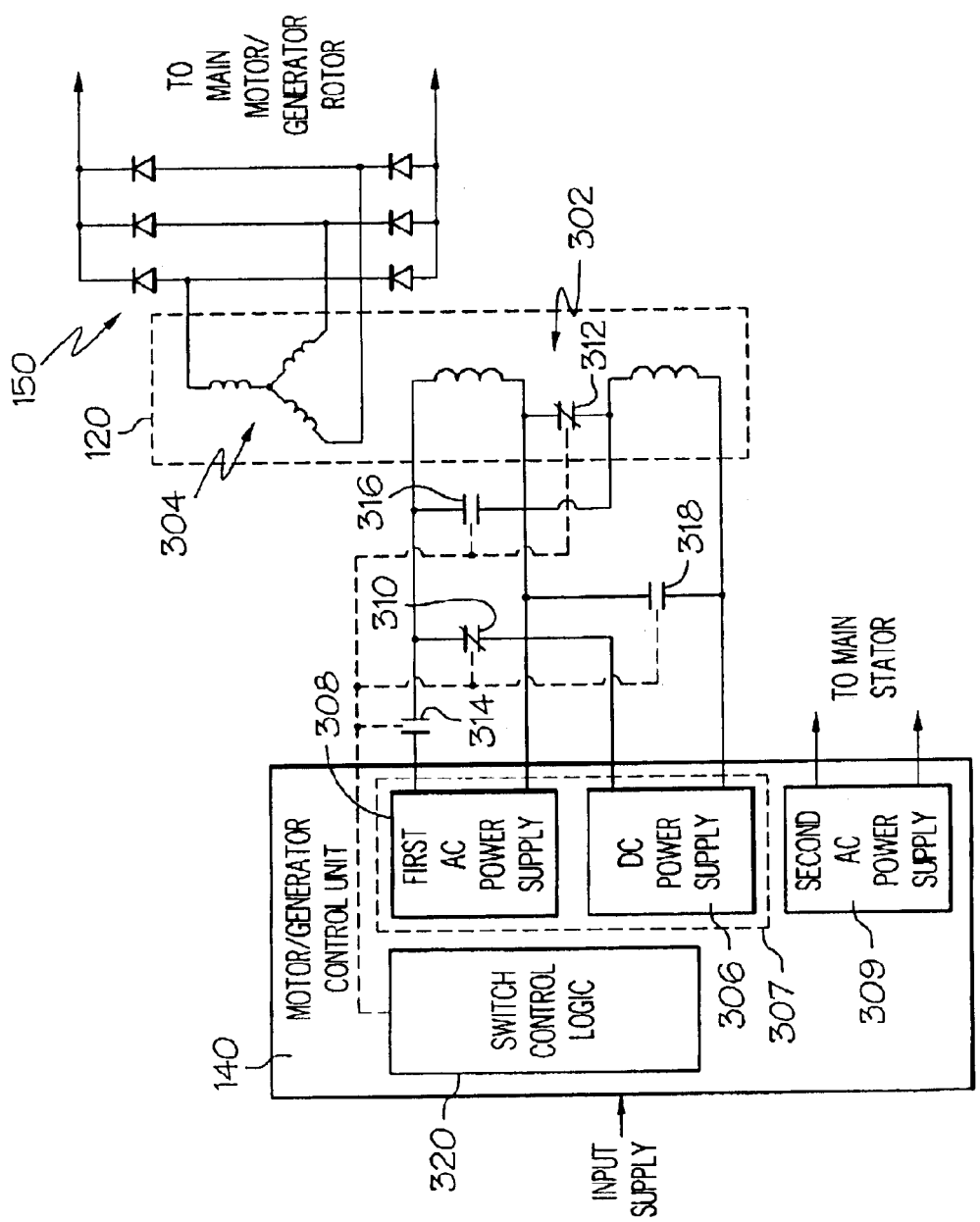
FIG. 3 is a functional schematic block diagram of an exemplary exciter generator stator winding configuration and control circuit that may be used in the starter-generator depicted in FIGS. 1 and 2.

The exciter stator 122 and exciter rotor 124, as shown schematically in FIG. 3, are each made up of a plurality of windings 302 and 304, respectively. As was noted above, during operation as a generator the control unit 140 supplies DC power to the exciter stator windings 302, and during operation as a motor the control unit supplies AC power to the exciter stator windings 302. Thus, the control unit 140 includes a first power supply 307 that is operable to supply either DC power or AC power. In the depicted embodiment, the first power supply 307 includes a DC power supply section 306 and a first AC power supply section 308. It will be appreciated that the DC 306 and AC 308 power supply sections need not be physically separate sections, but could be a single section that is configurable to supply either AC or DC power. When operating as a generator, the first power supply 307 supplies controllable DC power to the exciter stator windings 302. The DC power supplied to the exciter stator windings 302 generates a magnetic field in the exciter stator 122. A prime mover (not illustrated in FIG. 3) rotates the exciter rotor 124 and AC power is induced in the exciter rotor windings 304 as the exciter rotor 124 rotates through this magnetic field.

The control unit 140 also includes a second power supply 309 that supplies AC power. When operating as a motor, the first power supply 307 supplies AC power to the exciter stator windings 302, and the second power supply 309 supplies AC power to the main motor/generator stator 134 (not illustrated in FIG. 3). The AC power supplied to the exciter stator windings 302 generates an oscillating magnetic field in the exciter stator windings 302. This oscillating magnetic field induces a voltage in the exciter rotor windings 304, which causes an AC current to flow in the exciter rotor windings 304. This AC current is rectified by the rectifier assemblies 150 and the resultant DC current is supplied to the main motor/generator rotor 132, providing the DC excitation.

The exciter stator windings 302 are wound on the exciter stator 122 and are externally connected, via a plurality of controlled switches 310–318, such that the exciter stator windings 302 are selectively coupled in either series or parallel with one another. In particular, during operation as a generator, switch control logic 320 in the control unit 140 closes switches 310 and 312, and opens switches 314, 316, and 318, which electrically couples the exciter stator windings 302 in series with one another. Conversely, during operation as a motor, the switch control logic 320 opens switches 310 and 312, and closes switches 314, 316, and 318, which electrically couples the exciter stator windings 302 in parallel with one another. By electrically coupling the exciter stator windings 302 in parallel with one another, the overall AC impedance of the exciter stator windings 302 is reduced. Thus, a sufficiently high starting torque may be generated by using an AC power supply section 308 with a lower output voltage magnitude as compared to a starter-generator that maintains the exciter stator windings in series with one another during operation as both a generator and a motor.

Generally, when the motor/generator system 100 is being implemented as an aircraft starter-generator, the aircraft is on the ground and the starter-generator is initially operated as a motor. Thus, switches 310 and 312 are open, and switches 314, 316, and 318 are closed, electrically coupling the exciter stator windings 302 in parallel. In addition, the first AC power supply section 308 is electrically coupled to supply AC power to the exciter stator windings 302. As noted above, this AC power induces a voltage in the exciter rotor 124, which in turn is used to provide the DC excitation to the main motor/generator rotor 132. As was also noted above, the second AC power supply section 309 supplies AC power to the main motor/generator stator 134, which generates a field therein. The flux interaction between the main motor/generator stator 134 and main motor/generator rotor 132 gives rise to rotation. Then, when the rotational speed reaches a predetermined magnitude and is increasing, the motor/generator system 100 switches to operation as a generator. To do so, the switch control logic 320 automatically switches the configuration of switches 310–318, to couple the exciter stator windings 302 in series, and to coupled the DC power supply section 306 to the exciter stator windings 302. In addition, the first 308 and second 309 AC power supply sections are decoupled from the exciter stator windings 302 and the main motor/generator stator 134, respectively. It will be appreciated that the predetermined rotational speed at which operation switches from the motoring mode to the generating mode may vary, depending on the type of engine that is being started.

In the depicted embodiment, the switches 310–318 are each relay-operated contacts. It will be appreciated, however, that the other types of switches may be used. It will additionally be appreciated that circuit arrangements other than the one depicted in FIG. 3, in which the exciter stator windings 302 are depicted as being split into 2 equal sections, with 4 terminal connections, may also be used. The depicted configuration is merely exemplary of an embodiment that may be implemented with, for example, a 10-pole starter-generator. Other arrangements that may be implemented with a 10-pole starter-generator include splitting the exciter winding into 5 equal sections, with 10 terminal connections. Similarly, with a 12-pole starter-generator, the exciter windings may be split into 2, 3, 4, or 6 equal sections with, 4, 6, 8, and 12 terminal connections, respectively. It will also be appreciated that the switches 310–318 and/or the switch control logic 320 may be located in or one the exciter rotor 124.

Various other arrangements may be implemented for various other "N-pole" starter-generators. The number of sections and concomitant terminal connections may be selected to meet system design requirements and the desired reduction in AC impedance. Specifically, the AC impedance of the exciter stator windings 302 is reduced by the square of the number of parallel circuits. For example, with 2 parallel circuits the AC impedance is reduced by a factor of 4, with 3 parallel circuits the AC impedance is reduced by a factor of 9, and so on. Moreover, while splitting the exciter stator windings 302 into equal sections is presently preferred, this is merely exemplary of a preferred embodiment, and splitting the windings 302 into non-equal sections may also be done.

The switches 310–318 and exciter stator winding terminal connections may be included when the starter-generator system 100 is initially constructed, or may be installed into an existing starter-generator system 100. To modify an existing system 100, the exciter stator windings 302 are divided into the desired number of sections by selectively opening the winding connections at the desired locations. The appropriate number of terminal wires and switches may then be properly connected into the system, and either new or existing switch control logic 320 may be added to the control unit 140.

As was noted above, various exciter stator winding arrangements may be implemented for various "N-pole" starter-generator exciters 120. With reference to the remaining figures, one such alternate arrangement will now be described. According to this alternate arrangement, the exciter stator windings 302 are made up of one or more separate windings, each of which is wound in series around each one of the stator exciter poles. In particular, as illustrated more clearly in FIG. 4, which is a simplified representation of an exciter stator 122 having N-number of poles 402-1, 402-2, 402-3, . . . 402-N extending from a main body 401, a plurality of separate exciter stator windings 302-1, 302-2, 303-3, . . . 302-M are each wound in series around each one of the N-number of exciter stator poles 402-1, 402-2, 402-3, . . . 402-N. Each of the exciter stator windings 302-1, 302-2, 303-3, . . . 302-M is alternately wound on each pole 402-1, 402-2, 402-3, . . . 402-N to induce the polarities in the desired alternating north-south pattern, when current flows through the windings.

Figure 4:
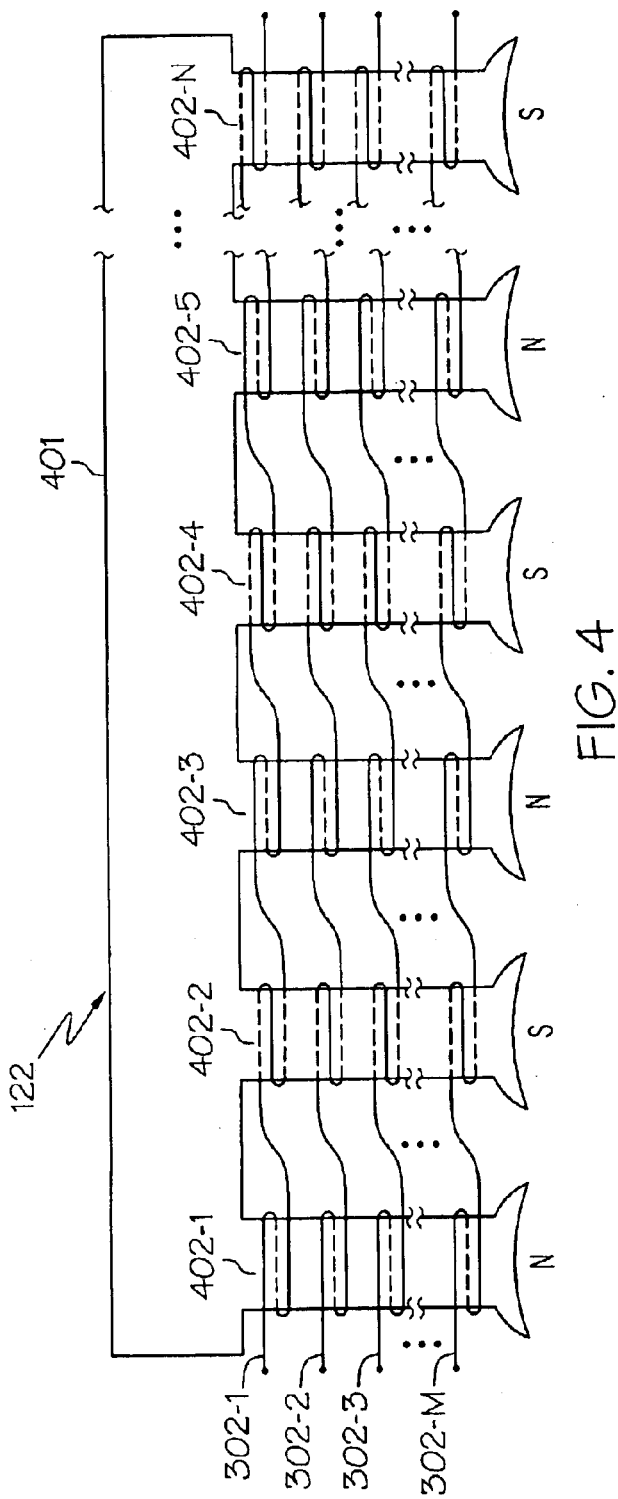
FIG. 4 is a simplified representation of an exciter stator according to an embodiment of the present invention.
Figure 5:
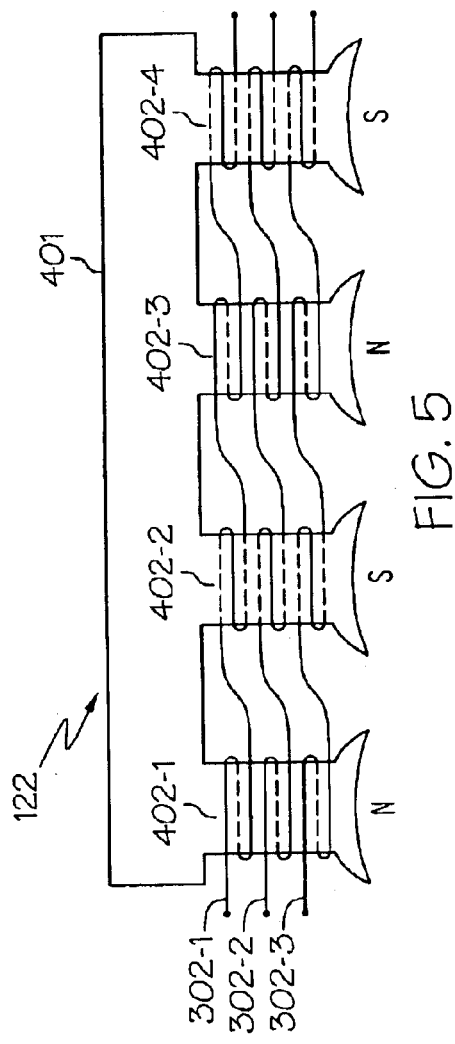
FIG. 5 is a simplified representation of a particular exemplary exciter stator.

As FIG. 4 further illustrates, each exciter stator pole 402-1, 402-2, 402-3, . . . 402-N has a total number of turns of windings thereon. Of this total number of turns, each of the exciter stator windings 302-1, 302-2, 303-3, . . . 302-M preferably make up 1/M of the total. For example, FIG. 5 depicts a 4-pole (e.g., N=4) exciter stator 122 with three separate exciter stator windings 302-1, 302-2, 303-3 (e.g., M=3) alternately wound, one turn each, in series on each of the poles 402-1, 402-2, 402-3, 402-4. Thus, each of the poles 402-1, 402-2, 402-3, 402-4 has three total winding turns thereon, and of this total, each exciter stator winding 302-1, 302-2, 303-3, . . . 302-M makes up ⅓ of the total (i.e., 1 turn). It will be appreciated that each of the exciter stator windings 302-1, 302-2, 303-3, . . . 302-M could be wound on each pole 402-1, 402-2, 402-3, . . . 402-N with more than one turn. It will additionally be appreciated that the exciter stator windings 302-1, 302-2, 303-3, . . . 302-M could be wound such that each do not make up 1/M of the total number of turns, though such a configuration is presently preferable.

Figure 6:
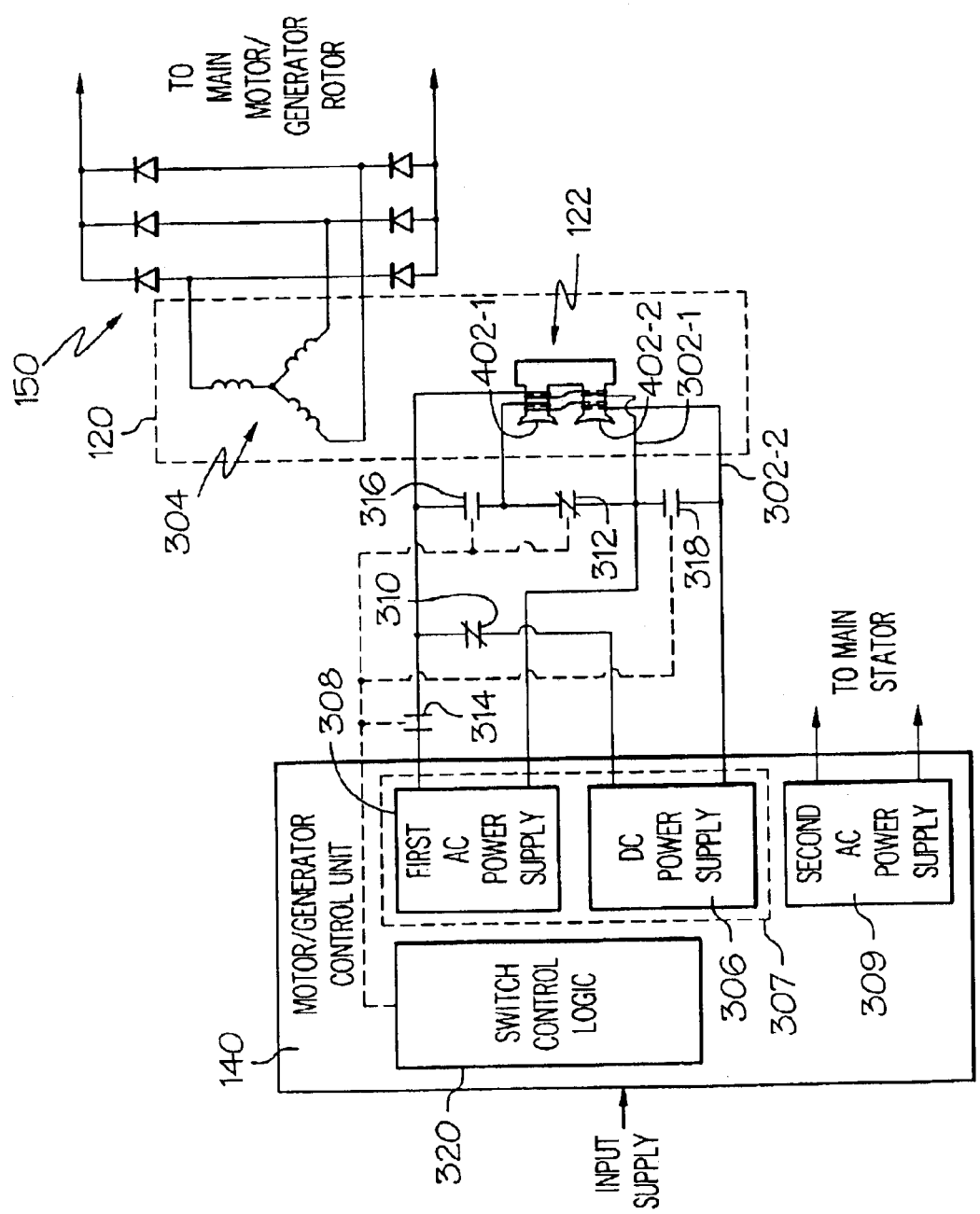
FIG. 6 is a functional schematic block diagram of an exemplary exciter generator stator winding configuration and control circuit that may be used with the exciter stator depicted in FIG. 4.

Turning to FIG. 6, an example of the above-described alternate embodiment will now be described. This particular example is of a 2-pole (e.g., N=2) exciter stator 122 having two separate exciter stator windings 302-1, 302-2 (e.g., M=2) alternately wound in series on each pole 402-1, 402-2. For additional clarity, the exciter stator 122 is represented in simplified form, as was done in FIGS. 4 and 5. The exciter stator windings 302-1, 302-2 are connected, via the plurality of switches 310–318, such that the exciter stator windings 302-1, 302-2 are selectively coupled in either series or parallel with one another. As with the previously described embodiment, during operation as a generator, the switch control logic 320 closes switches 310 and 312, and opens switches 314, 316, and 318, which electrically couples the exciter stator windings 302-1, 302-2 in series with one another. Conversely, during operation as a motor, the switch control logic 320 opens switches 310 and 312, and closes switches 314, 316, and 318, which electrically couples the stator windings 302-1, 302-2 in parallel with one another.

An exciter stator 122 configured as depicted in FIGS. 4–6 provides additional flexibility over the previously described embodiments. This is because any, or all, of the M number of exciter stator windings 302-1, 302-2, 303-3, . . . 302-M may be used, as desired to meet various system needs. In addition, any, or all, of the used exciter stator windings 302-1, 302-2, 302-3, . . . 302-N may be selectively coupled in series and parallel, as desired to meet various system needs. Thus, varying numbers of parallel exciter stator winding circuits may be implemented in an exciter that has any number of poles. This added flexibility allows the optimum winding configuration to be obtained for the start/motor mode, without affecting the starter-generator's performance in the generate mode, which is the starter-generator's primary operation mode.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A gas turbine engine starter-generator, comprising;

a housing;

a shaft rotationally mounted within the housing;

a main rotor mounted on the shaft; a main stator mounted within the housing and located at least partially around at least a portion of the main rotor;

an exciter rotor mounted on the shaft;

an exciter stator mounted within the housing and located at least partially around at least a portion of the exciter rotor, the exciter stator having N number of poles extending therefrom, N being an integer greater than one;

M number of separate exciter stator windings, M being an integer greater than one, each of the separate exciter stator windings wound in series around each of the N number of poles; and a control circuit electrically coupled to at least a first predetermined number of the M number of separate exciter stator windings and operable (i) to selectively supply AC and DC power thereto and (ii) to selectively couple at least a second predetermined number of the M number of separate exciter stator windings in one of series and parallel with one another.

2. The starter-generator of claim 1, wherein;

each of the N number of poles has a total number of turns of windings thereon; and each of the M number of separate exciter stator windings include 1/M turns of the total number of turns on each of the N number of poles.

3. The starter-generator of claim 1, wherein the control circuit comprises:

a first power supply operable to selectively supply one of AC power and DC power to the exciter stator windings.

4. The starter-generator of claim 3, wherein the first power supply comprises:

a first AC power supply section operable to supply AC power to the exciter stator windings; and a DC power supply section operable to supply DC power to the exciter stator windings.

5. The starter-generator of claim 3, wherein the control circuit further comprises:

a second power supply operable to supply AC power to the main stator windings.

6. The starter-generator of claim 1, further comprising:

a plurality of first controllable switches electrically coupled between selected ones of the M number of separate exciter stator windings; and a plurality of second controllable switches electrically coupled between the control circuit and selected ones of the M number of separate exciter stator windings.

7. The starter-generator of claim 6, wherein the control circuit includes:

switch control circuitry operable to selectively open and close selected ones of the plurality of first and second controllable switches, to thereby selectively supply the AC and DC power to the first predetermined number of exciter stator windings and to selectively couple the second predetermined number of exciter stator windings in one of series and parallel with one another.

8. The starter-generator of claim 7, wherein the first and second predetermined numbers are equal.

9. A motor/generator, comprising:

an exciter including a rotor configured to rotate within the motor/generator and a stator having N number of poles extending therefrom, N being an integer greater than one;

M number of separate exciter stator windings, M being an integer greater than one, each of the separate exciter stator windings is wound in series around each one of the N number of poles; and a control circuit electrically coupled to at least a first predetermined number of the M number of separate exciter stator windings and operable (i) to selectively supply AC and DC power thereto and (ii) to selectively couple at least a second predetermined number of the M number of separate exciter stator windings in one of series and parallel with one another.

10. The motor/generator of claim 9, wherein:

each of the N number of poles has total number of turns of windings thereon; and each of the M number of separate exciter stator windings include 1/M turns of the total number of turns on each of the N number of poles.

11. The motor/generator of claim 9, wherein the control circuit comprises:

a first power supply operable to selectively supply one of AC power and DC power to the exciter stator windings.

12. The motor/generator of claim 11, wherein the first power supply comprises:

a first AC power supply section operable to supply AC power to the exciter stator windings; and a DC power supply section operable to supply DC power to the exciter stator windings.

13. The motor/generator of claim 11, further comprising:

a rotationally mounted main rotor; a main stator located around at least a portion of the main rotor; and a second power supply operable to supply AC power to the exciter stator windings.

14. The motor/generator of claim 9, further comprising:

a plurality of first controllable switches electrically coupled between selected ones of the M number of exciter stator windings; and a plurality of second controllable switches electrically coupled between the control circuit and selected ones of the M number of exciter stator windings.

15. The motor/generator of claim 14, wherein the control circuit includes:

switch control circuitry operable to selectively open and close selected ones of the plurality of first and second controllable switches, to thereby selectively supply the AC and DC power to the first predetermined number of exciter stator windings and to selectively couple the second predetermined number of exciter stator windings in one of series and parallel with one another.

16. The motor/generator of claim 15, wherein the first and second predetermined numbers are equal.

17. An exciter stator, comprising:

a main body having N number of poles extending from a surface thereof, N being an integer greater than one; and M number of separate windings, M being an integer greater than one, each of the separate windings wound in series around each one of the N number of poles, wherein;

each of the N number of poles has total number of turns of windings thereon; and each of the M number of separate windings include 1/M turns of the total number of turns on each of the N number of poles.

18. A method of assembling an exciter stator, comprising:

supplying the exciter stator having N number of poles extending from a surface thereof, N being an integer greater than one;

winding M number of separate conductors, one each, in series around each of the N number of poles, M being an integer greater than one; and winding each of the M number of separate conductors a number of turns on each of the N number of poles, such that each pole has a total number of turns thereon, wherein each of the M number of separate conductors comprise 1/M turns of the total number of turns on each of the N number of poles.

19. In an aircraft starter-generator including at least an exciter assembly having a stator with N number of poles and M number of separate windings, N and M being integers greater than one, and each of the M number of stator windings is wound in series on each of the N number of poles, a method of operating the starter-generator in a generator mode and a motor mode, comprising:

electrically coupling at least a first predetermined number of the M number of exciter stator windings in parallel with one another and supplying AC power to the parallel-coupled exciter stator windings, to thereby operate the starter-generator in the motor mode; and electrically coupling at least a second predetermined number of the M number of exciter stator windings in series with one another and supplying DC power, rather than AC power, to the series-coupled exciter staler windings to thereby operate the starter-generator in the generator mode.

20. The method of claim 19, further comprising:

automatically switching the electrical coupling of the first and second predetermined number of the M number of exciter stator windings from parallel to series when a rotational speed of the exciter reaches a predetermined magnitude.

21. The method of claim 19, comprising:

automatically switching the electrical coupling of the first and second predetermined number of the M number of exciter stator windings from parallel to series when a rotational speed of the exciter reaches a predetermined magnitude and is increasing.

22. The method of claim 19, wherein the first and second predetermined numbers are equal.

* * * * *

UNITED STATES PATENT AND TRADEMARK OFFICE
CERTIFICATE OF CORRECTION

PATENT NO.    : 6,906,479 B2
DATED         : June 14, 2005
INVENTOR(S)   : Mingzhou Xu et al.

It is certified that error appears in the above-identified patent and that said Letters Patent is hereby corrected as shown below:

<u>Column 10,</u>
Line 45, change "staler" to -- stator --.
Line 54, insert -- further -- before "comprising".

Signed and Sealed this

Eighteenth Day of October, 2005

JON W. DUDAS
*Director of the United States Patent and Trademark Office*